Aug. 28, 1934.                J. VON ISSENDORFF                1,971,838
                      ARC RECTIFIER WITH CONTROLLING MEMBERS
                              Filed March 21, 1932
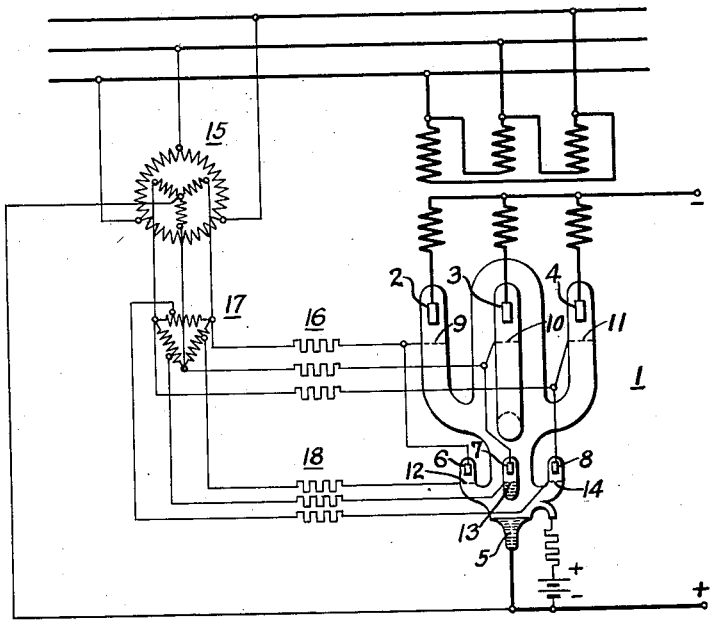
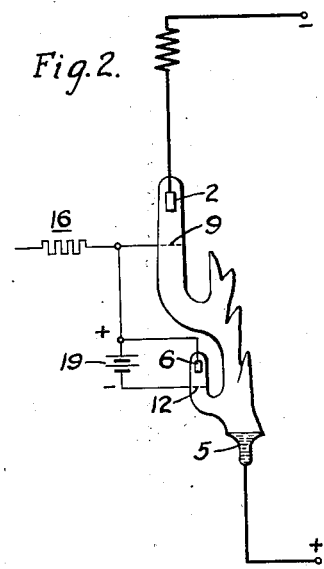
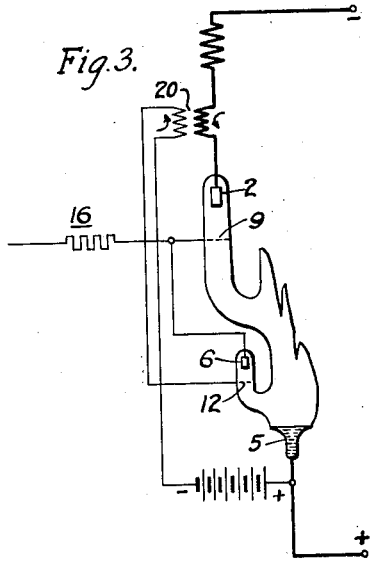
WITNESSES:
INVENTOR
Jürgen von Issendorff
BY
ATTORNEY Patented Aug. 28, 1934

1,971,838

UNITED STATES PATENT OFFICE 1,971,838

ARC RECTIFIER WITH CONTROLLING MEMBERS

Jürgen von Issendorff, Berlin-Siemensstadt, Germany, assignor to Westinghouse Electric & Manufacturing Company, a corporation of Pennsylvania Application March 21, 1932, Serial No. 600,149
In Germany March 20, 1931

6 Claims. (Cl. 175—363)

(Granted under the provisions of sec. 14, act of March 2, 1927; 357 O. G. 5)

This invention relates to gaseous electrical discharge devices having control electrodes, and more particularly to mercury arc discharge tubes.

It has been found possible to regulate current flow through gaseous electrical discharge devices by controlling the potential of a grid or other control electrode intervening in the path of current flow between a pair of principal electrodes. For example, tubes having a mercury cathode excited by a continuously operating branch and a cooperating anode have been used to control current flow, particularly from periodic voltage sources, by providing means for controlling at will the potential of a grid or other control electrode situated in the path of current flow between the mercury cathode and the other main electrode. Such arrangements have been used as rectifiers in which the output current is controlled by controlling the potential of the grid electrode; and have also been used for changing from direct current to alternating current, or from alternating current of one frequency to alternating current of another frequency by properly controlling the potential of the control electrodes.

A further use of such tubes has been to control current flow in periodic current circuits, making the potential of the grid electrodes negative relative to the cathode during such portions of the periodic cycles as current flow is not desired, and making the grid potentials positive relative to the cathode at the instant in the periodic cycle when it is desired that current flow should begin. Under such circumstances, current usually continues to flow, regardless of the subsequent potential of the control electrode, until the end of the periodic voltage cycle.

It is usually desirable that the main anode of tubes of the foregoing type shall be situated in arms or other comparatively restricted subdivisions of the enclosing tube or container; and that the control electrode be positioned in such subdivisions relatively close, some times within a mean-free-path distance, of the anode in order that the control effect shall be pronounced.

Supposing, under such circumstances that an alternating voltage is impressed between the main anode and the excited cathode, no current flow between the two will take place as long as the control electrode remains negative in potential relative to the cathode. However, if the control electrode is made positive while the main voltage wave of the cathode relative to the anode is positive, current flow will begin almost immediately, both between the control electrode and the cathode and between the anode and the cathode. This current flow will continue until the potential of the main anode falls to zero, when the main anode current flow will cease. The current from the control electrode, which is generally made small by passing it through a high resistance, may continue and maintain the gas in the vicinity of the anode in a considerably ionized condition. This ionization continues for an appreciable time even after the control electrode potential relative to the cathode has sunk to zero. Under the desired operation of the device, current flow from the main anode should not begin even when it becomes positive relative to the cathode until the control electrode also is made positive; but if this residual ionization is present, it has been found in some instances that current flow from the main anode does begin practically as soon as its potential relative to the cathode becomes positive, and even though the potential of the control electrode has not been made positive, or even when it remains somewhat negative.

Accordingly, it is an object of this invention to avoid difficulties from the presence of such residual ionization in the vicinity of the main anode; and this result is accomplished by cutting off current flow from the control electrode to the cathode immediately after the arc from the main anode has started. This result is effected automatically by providing auxiliary electrodes connected in parallel with each control electrode and positioned in a remote part of the tube or enclosure from the anode, preferably in a space near the mercury cathode.

Since under the circumstances the resistance to current flow between the auxiliary electrodes last mentioned is smaller than that to current flow from the control electrodes, any current flow established to the latter will be shunted away by the shorter path through the auxiliary electrodes; and in this way the residual ionization near the main anodes will not be maintained by current flow to the control electrodes.

To assist in the transfer of current flow from the control electrodes to the auxiliary electrodes in parallel with them, it may be desirable to connect in circuit with the latter resistance which are smaller than those in series with the control electrodes; or to energize the latter by means of alternating currents displaced in phase to be applied to the control electrodes. The interposition of direct current potentials preferably biasing the control electrodes to a voltage negative relative to the auxiliary electrodes is also a possible expedient to be used. The discharge paths in parallel between the control electrodes and the cathode may likewise comprise mercury arc or other discharge paths in separate containers electrically connected in multiple across the respective leads to the cathode and the control electrode of the main discharge tube. One of the most effective features in the arrangements contemplated is that the shunt path through the auxiliary discharge shall be of lower voltage drop than that between the control electrode and the cathode.

As an illustration of the way in which the principles may be embodied in practical apparatus, the following description taken may be used taking it in connection with the appended drawing, in which Figure 1 illustrates a mercury arc tube provided with control electrodes and auxiliary electrodes in accordance with my invention and supplied from their inner ring a circuit and an alternating current, Fig. 2 shows a modified arrangement of the control electrode and auxiliary electrodes, and Fig. 3 shows still another modified arrangement of the electrodes last named.

Referring particularly to drawing in which similar reference numerals apply to corresponding structural elements. The rectifier 1 has been designed as a twin-unit type, one unit consisting of a part containing the main anodes 2, 3 and 4, and a part containing the cathode 5, and the other unit consisting of a part containing the auxiliary anodes 6, 7 and 8, and the part containing the cathode 5 already mentioned. It will be seen from Fig. 1, that the discharge paths of the auxiliary anodes 6, 7 and 8 are connected in parallel with the discharge paths running from the main anodes to the cathode, the auxiliary anodes being connected to the controlling grids 9, 10 and 11 of the main anodes. Each auxiliary anode 6, 7 or 8 is also equipped with a controlling member 12, 13 or 14.

The potential of the control electrodes relative to the cathode is determined in magnitude and phase by a transformer 15 having its primary connected to the A. C. lines supplying the rectifier and a secondary, which may be rotated to any desired phase position and which has variable taps to fix voltage magnitude, connected through resistors 16 to control electrodes 9, 10, 11. A secondary transformer which may be similar to transformer 15 or may be an auto-transformer impresses voltages on auxiliary electrodes 12, 13, 14 through resistors 18. Other well known methods of determining the respective potentials of the electrodes 9, 10, 11 and 12, 13, 14 will however be evident to those skilled in the art and may be used where suitable.

The controlling members 12 of the auxiliary anodes in Fig. 2 are connected to an alternating voltage, the arrangement being such that, with respect to the auxiliary anodes to which alternating voltages are also applied, the controlling members have a negative potential 15. The diagram of Fig. 2 has been simplified insofar as only one main anode and one auxiliary anode are shown.

The controlling members 12 of the auxiliary anodes 6 in Fig. 3 have a negative potential with respect to the cathode 5 of the rectifier. A positive voltage-impulse is suddenly applied to the controlling member of an auxiliary anode, for instance by inductive means 16, at the instant when the arc of the corresponding main anode 2 is ignited; this voltage-impulse will ignite the arc for said auxiliary anode, and the current carried by the controlling electrode of the main anode just referred to will be transferred to this auxiliary anode.

Instead of controlling grids, conductive layers can be used which do not have to take any direct active part in the discharge; in this particular case it will be sufficient to remove the positive potentials of these conductive layers, in line with the principle set forth in this description.

It will be recognized that the above-described embodiments of the broad principles of my invention are given for purposes of illustration and that any other modifications evident to those skilled in the art are intended to be covered by certain of the following claims.

I claim as my invention:

1. A gaseous electrical discharge device comprising an anode, a cathode, a control electrode therefor, a discharge path electrically in multiple with the path from said control electrode to said cathode, and means to initiate current flow in said discharge path in response to substantial current flow from said anode to said cathode.

2. A gaseous electrical discharge device comprising an anode, a cathode, a control electrode therefor, a discharge path electrically in multiple with the path from said control electrode to said cathode, and remote from said last-named path, and means to initiate current flow in said discharge path in response to substantial current flow from said anode to said cathode.

3. A gaseous electrical discharge device comprising two main electrodes and a control electrode for the discharge path between them, a second discharge path electrically in multiple with, but remote from, the path from said control electrode to one of said main electrodes, and means to initiate current flow in said second discharge path in response to substantial current flow between said main electrodes.

4. A gaseous electrical discharge device comprising two main electrodes and a control electrode for the discharge path between them, a second discharge path electrically in multiple with the path from said control electrode to one of said main electrodes, and means to initiate current flow in said second discharge path in response to substantial current flow between said main electrodes.

5. A gaseous electrical discharge device comprising two main electrodes and a control electrode for the discharge path between them, a second discharge path between electrodes electrically in multiple with the path from said control electrode to one of said main electrodes, and means to initiate current flow in said second discharge path immediately after the initiation of current flow between said main electrodes.

6. A gaseous electrical discharge device having two main electrodes and a control electrode for the discharge path between them, a second electrical path remote from but electrically in multiple with the path from said control electrode to one of said main electrodes, and means to control current flow in said second electrical path in response to substantial current flow between said main electrodes.

JÜRGEN von ISSENDORFF.